INVENTOR.
JAMES CHURCH
BY
ATTORNEYS

United States Patent Office 3,289,493
Patented Dec. 6, 1966

3,289,493
BICYCLE HANDLEBAR ATTACHMENT
James Church, 1656 5th St., Muskegon, Mich.
Filed Jan. 28, 1965, Ser. No. 428,681
4 Claims. (Cl. 74—551.8)

This invention relates to a bicycle control stick attachment, and more particularly to a bicycle control stick attachment enabling the rider to simulate lateral maneuvers of aircraft.

Corrective actions of aerial craft involve lateral movements of the control stick. More specifically, undesired "tilting" of the plane to the right requires corrective leftward movement of the stick for correcting the position of the plane to a horizontal position. Tilting of the plane to the left requires rightward corrective stick movement.

Since a ridden bicycle, when leaning to the left, can be corrected to an upright position by turning the front wheel to the left (and when leaning to the right can be corrected by turning the front wheel to the right), conceivably a stick attachment could be provided, which, when pushed to the right causes leftward front wheel turning for leftward tilting correction, or rightward front wheel turning for rightward tilting correction. Such an attachment would then simulate the control stick of an airplane in a general manner.

It is an object of this invention to provide a control stick attachment for a bicycle, enabling lateral correction in a manner generally simulating that of an aircraft.

Another object of this invention is to provide a control stick attachment for a bicycle enabling the rider to correct the bicycle position in a unique manner, generally similar to the control of an aircraft, so that leftward tilting is corrected by stick movement to the right and vice versa. The device is attached to the bicycle at the handlebar-gooseneck assembly. It utilizes engagement with this assembly for stability and control, preferably at three points in different dimensional variations. It is relatively simple in construction, yet enables excellent overall handling of the vehicle. The device is relatively inexpensive, thereby being within the price range of the average bicycle owner.

Another object of this invention is to provide an inexpensive bicycle attachment which generally enables control of the bicycle with a control stick, having three point stability engagement on the handlebar-gooseneck assembly, and which can be pivoted out of the way to enable bicycle handling in normal manner.

These and several other objects of this invention will become apparent upon studying the following specification in conjunction with the drawings in which.

Figure 1:
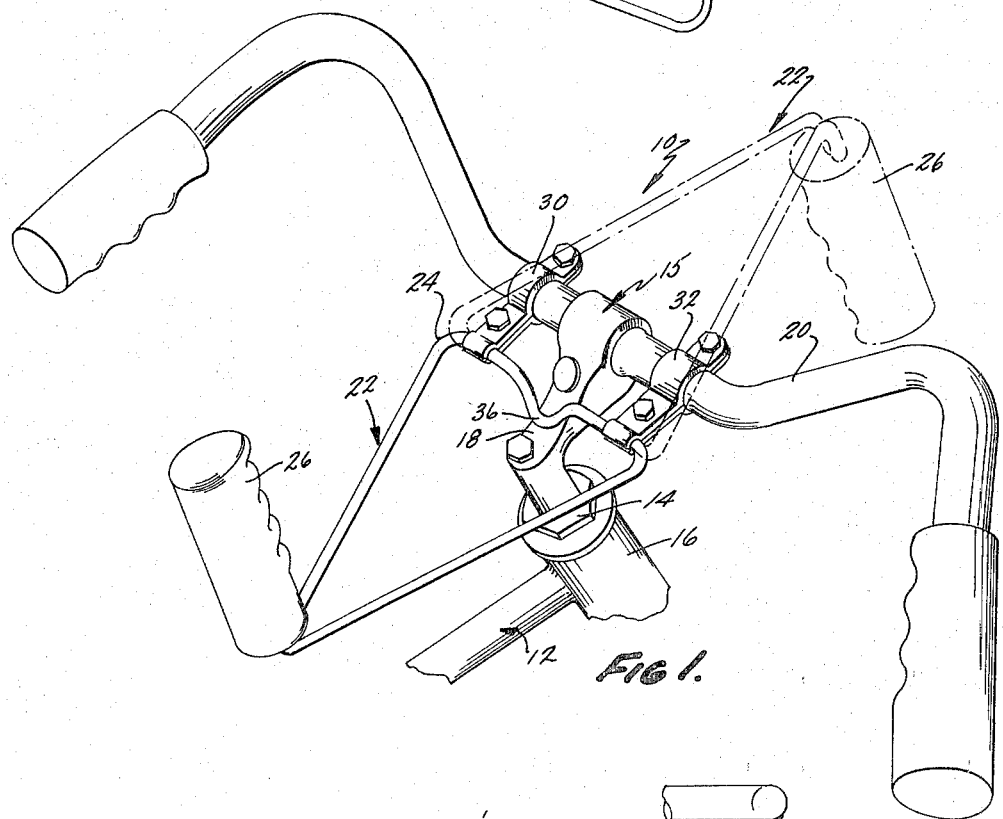
FIG. 1 is a perspective view of the attachment unit shown in combination with a bicycle, specifically, mounted on the handlebar-gooseneck assembly, shown in solid in its operating position and in phantom in the stored position.

Referring now specifically to the drawings, the complete bicycle and control unit combination 10 (FIG. 1) includes the combination of a conventional bicycle 12 having a typical frame, wheels, and drive assembly, all the details of which are not shown since these are conventional. It includes a gooseneck and handlebar sub-assembly 15. The sub-assembly includes a gooseneck which has a cylindrical base portion 14 extending into the cylindrical, receiving sleeve 16 of the frame. It also has a diagonally forwardly and upwardly extending upper portion 18 which teminates in a transverse, split socket to receive the pair of handlebars 20. A bolt secures the split gooseneck on the center of the handlebars 20 in conventional fashion.

The control stick attachment 22 is mounted to the handlebar-gooseneck sub-assembly for control of the bicycle independently of the handlebars. The mounting has lateral rigidity. More specifically, this control stick assembly includes a body portion 24 preferably of a high carbon steel bar deformed into a generally triangular configuration. At the rear end of the triangular body is the control stick gripping element 26. The triangular bar has its free ends terminating in an upwardly extending pair of adjacent end portions 24' (FIG. 3) received by and enveloped in the handle grip element. These ends and the grip element project upwardly, normal to the plane of body 24. The tight fit therebetween is achieved by filling the grip around the bars with any suitable filler such as a polymer, wood, or the like.

This triangular body is normally retained in a generally horizontal position extending back from the handlebar-gooseneck sub-assembly. It preferably has a three point engagement with this assembly due to its two point clamping relationship on the handlebars and its abutment relationship on the forward extending portion of the gooseneck.

Clamping is achieved by a pair of clamps 30 and 32, preferably of high carbon heat treated steel, spaced from each other, astraddle the gooseneck, and mounted on the base of the triangle opposite its rear apex. Each of these clamps has a pair of like elements. Each element has a pair of semicylindrical concavities with a pair of flat adjacent surfaces. The concavities encompass half the handlebar circumference, and half the attachment bar circumference. The lower halves are mated with the cooperative, like upper halves. A pair of bolts extending through the flat surfaces secure the elements tightly on the handlebars. The rear ends of the clamps snuggly curl around the base of the rod in body 24 to form a snug pivotal connection therewith. These clamps thus project forward from the base front end of the triangular body to the handlebars.

Figure 3:
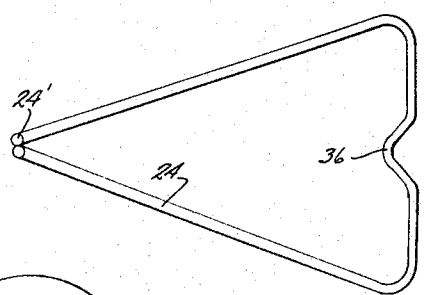
FIG. 3 is a plan view of the attachment head shown in FIG. 2.
Figure 4:
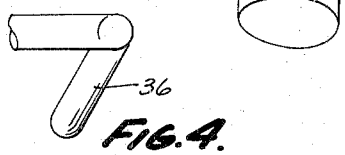
FIG. 4 is a side view of a detail.
Figure 2:
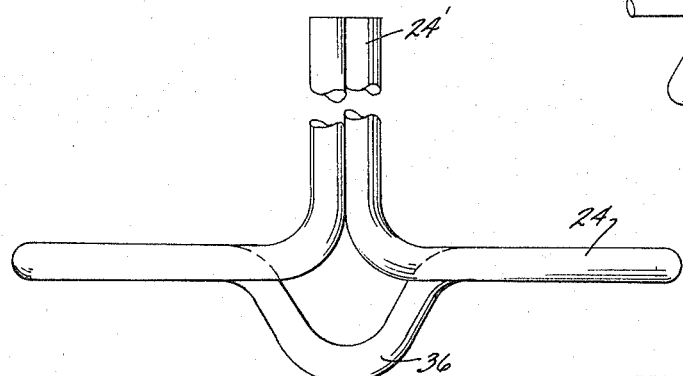
FIG. 2 is an elevation view of the attachment from the rear end thereof, with the grip element removed.

Between the clamps, the base of the triangular rod has a depending bight 36 which cooperates with the forwardly projecting upper end of the gooseneck. This bight is generally V-shaped or U-shaped in configuration as shown in FIG. 3, having downwardly convergent legs terminating in a curved end. The bight projects downwardly from the plane of the body at a large acute angle (FIG. 4), which will vary depending upon the slope of the upper end 18 of the particular gooseneck involved. It normally is at least about 45°, but usually less than about 90°, to cause the attachment to lie in a horizontal plane. This bight, when engaging the gooseneck, effects, in combination with the two spaced clamps, three point engagement which is rigid against downward, forward and lateral thrust on the control stick. The third point of contact is located below the plane of the attachment body and basically therefore has a cantilever mounting from the gooseneck-handlebar assembly, projecting rearwardly toward the rider.

To attach the unit to a bicycle, clamps 30 and 32 are secured to the handlebars by separating the two halves of each clamp, placing them on the upper and lower portions of the handlebars, and tightening the bolts. They are positioned equal amounts on opposite sides of the gooseneck so that bight 36 abuts and rests upon the gooseneck.

The bicycle rider grasps the vertical control stick handle 26 for maneuvering of the bicycle. Shifting the control stick to the right will cause turning of the bicycle front wheel to the left, and vice versa. Thus, when making corrective actions for bicycle tilting, if the bicycle tilts to the left, the control stick is shifted to the right for correction. This, of course, causes the bicycle to turn to the left since the pivot axis of the gooseneck is between the clamping connection of the attachment to the handlebar and gooseneck assembly, and the handle stick 26. If the bicycle tilts to the right, and is to be corrected, the stick is shifted to the left. These motions simulate aircraft stick movements for corrective action.

Actual use on bicycles has shown that a small amount of time is initially required to enable the user to gain excellent control of the bicycle by the use of this novel stick attachment. After the technique is conquered, however, maneuvers can be made very readily on the bicycle. Since the actions made are similar to those for correction of like lateral movements of an aircraft in flight, the attachment not only has attraction to bicycle enthusiasts because of the novelty action achieved, but also has a training value.

If it is desired to shift the control stick out of the way and control the bicycle in conventional fashion with the handlebars, it is merely pivoted up over the top of the handlebars to rest in a forwardly projecting position due to the pivot connection between the clamps and the front base leg of the triangular body.

Certain structural details could conceivably be changed in this particular preferred form of the device without departing from the concept taught. Hence, the invention is intended to be limited only by the scope of the appended claims, and the reasonably equivalent structures to those defined therein.

I claim:

1. A control stick attachment for a bicycle having a gooseneck with an upwardly projecting base and an upwardly and forwardly projecting upper end secured to handlebars, comprising: a rod formed into a triangular shaped rigid body; a control stick grip extending upwardly generally normal to said body at the apex of said triangle for gripping; a pair of spaced clamps on the base of said triangle opposite said apex for attachment to the bicycle handlebars on opposite sides of the gooseneck; said base including a bight depending from said body between said clamps, to extend down and abut the gooseneck, whereby said clamps and bight provide three point bearing while allowing control of the bicycle with said stick.

2. A control stick attachment for a bicycle having a gooseneck with an upwardly projecting base and an upwardly and forwardly projecting upper end secured to handlebars, comprising: a triangular shaped rigid body; a control stick handle extending generally normal to said body at the apex of said triangle for gripping; spaced handlebar clamps on the base of said triangle opposite said apex, for attachment to the handlebars on opposite sides of the gooseneck; said base including a bight depending between said clamps, to abut the gooseneck for firm support thereon; and said triangle base being pivotally connected to said clamps to allow said attachment to be rotated up over the handlebars and out of the way.

3. A control stick attachment for a bicycle having a gooseneck with an upwardly projecting base and an upwardly and forwardly projecting upper end secured to handlebars, comprising: a horizontally extending body having front and back ends; a gripping handle extending upwardly generally normal to said body at the back end thereof; spaced handlebar clamps mounted to and extending generally horizontally from the front end of said body; and said body having a thrust-bearing, gooseneck abutting frontal portion between said clamps to bear against the gooseneck and, in combination with said clamps, provide stability against downward and forward thrust on said gripping handle, and allow handlebar and gooseneck turning with lateral thrust on said handle.

4. A bicycle control stick attachment comprising: clamping means configurated to be attached to bicycle handlebars on both sides of the bicycle gooseneck; a body extending from said clamping means back toward the bicycle rider when said clamping means are secured; said body including a bight extending downwardly at a large acute angle therefrom, generally adjacent said clamping means, to project downwardly against the gooseneck and provide bearing support below the place of said clamping means; and a gripping handle at the opposite end of said body from said bight and clamping means, extending upwardly generally normal to said body, generally in the opposite direction therefrom as said bight.

References Cited by the Examiner

UNITED STATES PATENTS

| | | | |
|---|---|---|---|
| 586,897 | 7/1897 | Godfrey | 74—551.8 |
| 734,742 | 7/1903 | Patrick | 74—551.8 |
| 1,715,902 | 6/1929 | Countryman | 74—557 |
| 1,866,111 | 7/1932 | Jones | 74—557 |
| 2,754,505 | 7/1956 | Kenyon | 74—551.8 |

KENNETH H. BETTS, *Primary Examiner.*